(12) United States Patent
Mielke et al.

(10) Patent No.: US 8,657,926 B2
(45) Date of Patent: Feb. 25, 2014

(54) DEVICE AND METHOD FOR CONDENSING WATER

(75) Inventors: Jürgen Mielke, Bamberg (DE); Klaus Strätz, Trunstadt (DE)

(73) Assignee: Siemens Aktiengesellschaft, München (DE)

(*) Notice: Subject to any disclaimer, the term of this patent is extended or adjusted under 35 U.S.C. 154(b) by 229 days.

(21) Appl. No.: 13/264,022

(22) PCT Filed: Apr. 12, 2010

(86) PCT No.: PCT/EP2010/054758
§ 371 (c)(1),
(2), (4) Date: Oct. 12, 2011

(87) PCT Pub. No.: WO2010/119008
PCT Pub. Date: Oct. 21, 2010

(65) Prior Publication Data
US 2012/0037343 A1 Feb. 16, 2012

(30) Foreign Application Priority Data
Apr. 17, 2009 (DE) .................. 10 2009 017 840

(51) Int. Cl.
*B01D 45/00* (2006.01)
(52) U.S. Cl.
USPC .............. 95/267; 95/288; 95/289; 95/115; 95/117; 55/522; 55/527; 55/315.1; 55/434.1; 55/434.2; 55/525; 55/526; 55/498; 55/DIG. 17
(58) Field of Classification Search
USPC .......... 55/522, 527, 315.1, 434.1, 434.2, 525, 55/526, 498, DIG. 17; 95/267, 288–289, 95/115, 117; 165/104.21, 138
See application file for complete search history.

(56) References Cited

U.S. PATENT DOCUMENTS

| 4,600,416 A | 7/1986 | Mann |
| RE38,893 E * | 11/2005 | Fujimura .................. 95/113 |

FOREIGN PATENT DOCUMENTS

| DE | 519618 C | 3/1931 |
| DE | 4435642 A1 | 4/1995 |
| DE | 19804682 A1 | 8/1999 |
| DE | 19849216 A1 | 4/2000 |
| DE | 10107533 A1 | 8/2002 |
| EP | 0419007 A1 | 3/1991 |
| EP | 0737499 A1 | 10/1996 |
| EP | 1829599 A2 | 9/2007 |
| JP | 2001070737 A | 3/2001 |
| JP | 2002301302 A | 10/2002 |
| WO | WO 2008018071 A2 | 2/2008 |

* cited by examiner

Primary Examiner — Dung H Bui

(57) ABSTRACT

A device for condensing water includes a container with a plurality of openings and a heat transfer zone arranged in an interior of the container. The heat transfer zone includes a bulk material layer and/or a fiber layer and/or a textile layer and/or a grid layer and/or a lattice layer and/or a perforated plate. The interior of the container is subdivided by the heat transfer zone into a first zone and a second zone. Further, the heat transfer zone has at least in sections an open porosity and/or channels through which process gas can flow from the first zone to the second zone and through which a further process gas in the form of cooling gas can flow in a reverse direction. A permeable region of the heat transfer zone partially includes materials which have a thermal conductivity of more than 20 W(mK)$^{-1}$ in a temperature range up to 300° C.

12 Claims, 2 Drawing Sheets

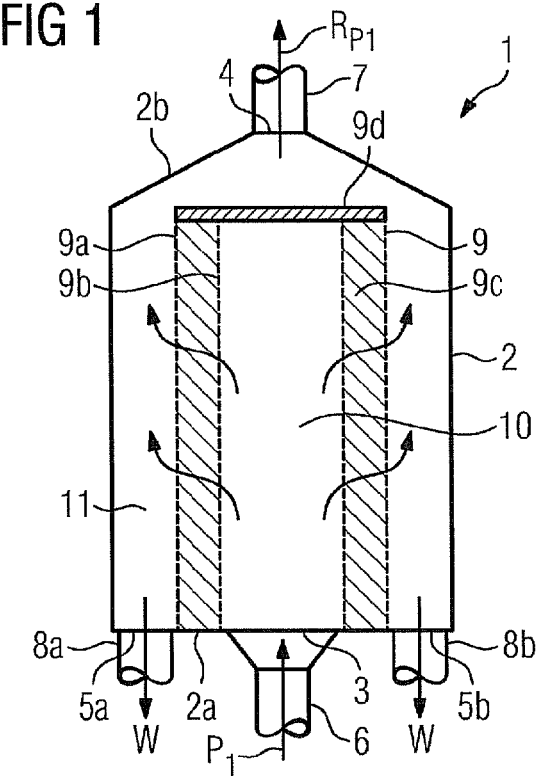
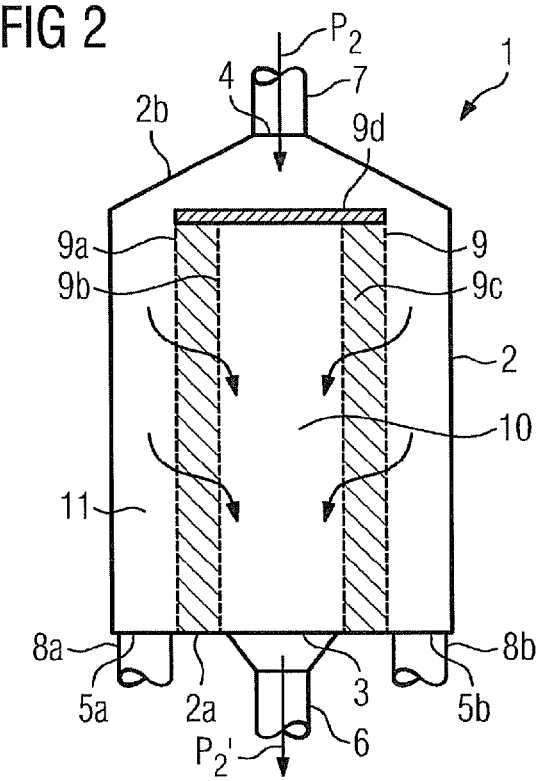

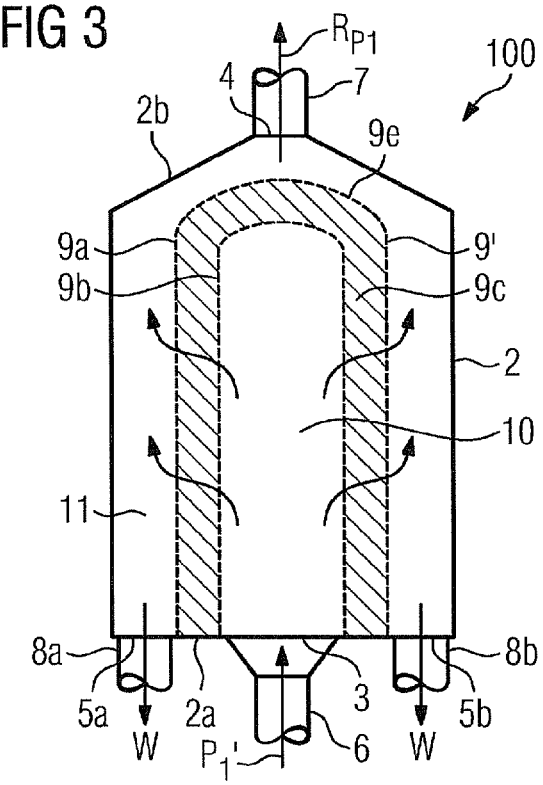
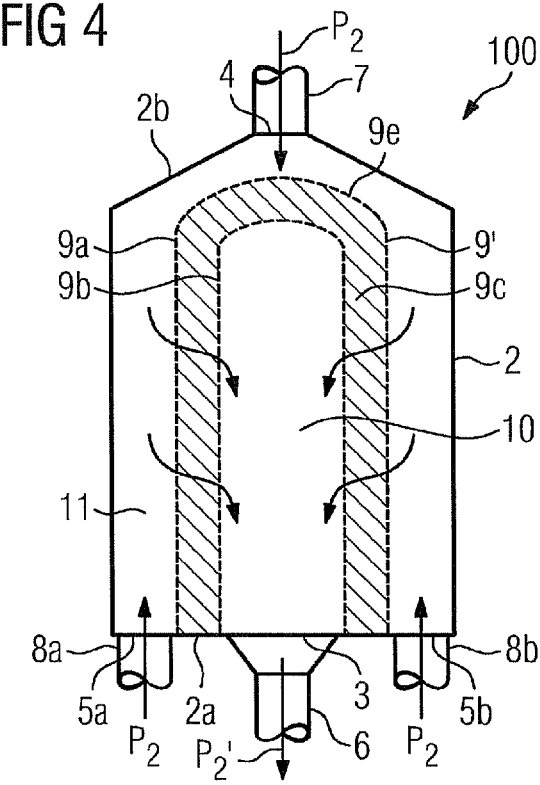

DEVICE AND METHOD FOR CONDENSING WATER

CROSS REFERENCE TO RELATED APPLICATIONS

This application is the US National Stage of International Application No. PCT/EP2010/054758 filed Apr. 12, 2010, and claims the benefit thereof. The International Application claims the benefits of German Patent Application No. 10 2009 017 840.6 DE filed Apr. 17, 2009. All of the applications are incorporated by reference herein in their entirety.

FIELD OF INVENTION

The invention relates to a device and to a method for condensing water from water vapor or from a gas containing water vapor.

BACKGROUND OF INVENTION

It is already known to condense and precipitate water from water vapor or from a gas containing water vapor by way of cooling the water vapor or gas containing water vapor by using cooling water for the cooling process. With this first known method heat is conducted to the cooling water and the latter is then re-cooled in a cooling tower, with significant quantities of water being lost due to evaporation.

Alternatively it is already known to condense water from water vapor or from a gas containing water vapor in a closed circuit, the water vapor or gas containing water vapor being cooled by means of a gaseous cooling medium such as cooling air for example. The condensed water is collected and supplied to a further use. However, this second method is associated with considerably higher operating costs than the first method. Considerable quantities of thermal energy are lost unused when performing both the first and the second method.

SUMMARY OF INVENTION

It is an object of the claimed invention to provide a device and a method for condensing water which allow a more cost-effective use of the thermal energy and water in water vapor or gas containing water vapor.

The object is achieved for the device for condensing water from water vapor or from a gas containing water vapor in that said device comprises a container having at least one first opening, at least one second opening and at least one third opening, and a heat transfer zone which is arranged in an interior of the container and which is permeable at least in sections, wherein the interior of the container is subdivided by means of the heat transfer zone into a first zone and a second zone, and wherein the at least one first opening leads into the first zone and the at least one second opening and the at least one third opening lead into the second zone.

A permeable region of a heat transfer zone is in the present context understood to mean that the heat transfer zone comprises channels and/or an open porosity at that location and consequently gas and/or water vapor permeability exists.

The object is achieved for the method for condensing water from water vapor or from a gas containing water vapor in that the following cycles are executed alternately using the inventive device:

performing a condensation cycle by
introducing a first process gas in the form of water vapor or from a gas containing water vapor via the at least one first opening into the first zone of the container;
transferring the first process gas through the heat transfer zone into the second zone with condensation of water and heating of the heat transfer zone;
discharging the condensed water through the at least one third opening of the container and the gaseous residue of the process gas through the at least one second opening of the container; and
performing a blowing cycle by
introducing a second process gas in the form of cooling gas via at least the at least one second opening into the second zone of the container;
transferring the second process gas through the heat transfer zone into the first zone with cooling of the heat transfer zone;
discharging the heated second process gas through the at least one first opening of the container.

The inventive device has a simple design and can therefore be manufactured at low cost. The device and the inventive method allow significantly better use of the thermal energy and water which are stored in water vapor or gas containing water vapor than was possible with previously known methods and devices. Furthermore, the operating costs of the inventive device and the inventive method are considerably reduced compared with those of previously used devices and methods.

The condensed water is normally pure water or almost pure water and can usually be supplied, or re-supplied, directly to an industrial process, for example as feed water. However, the condensed water can, if required, alternatively also be supplied to a quality inspection and/or treatment process. This is particularly advantageous if a specific level of purity, pH value and the like is important to the further use of the condensed water.

Preferred embodiments of the device and method are recited in the dependent claims and will be explained in detail hereinafter.

For the device it has proven expedient if the container has a longitudinal axis and the longitudinal axis extends through the center point or center of mass of the at least one first opening and the at least one second opening. It has also proven to be advantageous to construct the container with a rotationally symmetrical circumference, with the longitudinal axis serving as the axis of rotation. A container is particularly preferably formed with a circular circumference which is provided on its bottom side with a flat, curved or conical base plate and on its top side with a hood-shaped or conical closure. The container is preferably made from steel.

It has also proven expedient to arrange the at least one first opening and the at least one third opening in the region of a bottom side of the container and in addition to arrange the at least one second opening in the region of a top side of the container. The at least one third opening is particularly preferably arranged at the lowest point of the container, such as in the base plate of the container for example. Condensed water which collects there as a result of gravity can therefore be channeled away directly and without additional aids such as pumps or the like.

An arrangement of the at least one first opening, which is used, inter alia, for introducing water vapor or gas containing water vapor, in the center of the base plate of the container has proven to be particularly expedient. The at least one third opening is consequently preferably arranged on a radius around the centrally arranged, at least one first opening. The at least one second opening preferably forms the end of the hood-shaped or conical closure at a top side of the container. In this case the at least one first opening is advantageously arranged in alignment with the at least one second opening.

Other arrangements of the at least one first, second and third openings may also be used, however, depending on the design of the container. Thus, an elongate container may also be used horizontally instead of standing vertically. In such a case the at least one first opening is preferably arranged on one side and the at least one second opening is preferably arranged on the opposing side. The at least one third opening is preferably arranged in the region of the middle of the container at the lowest point thereof.

It has also proven expedient if a guide system in the form of, for example, ridges, grooves or the like is arranged in the region of the bottom side of the container, which elements reliably conduct condensing water away in the direction of the at least one third opening.

Starting from the region of the container in which the at least one first opening is located, such as, for example, a bottom side, in particular base plate, of the container, the heat transfer zone preferably extends tubularly in the direction of the at least one second opening. The heat transfer zone in the process accommodates the first zone and forms for example a hood-shaped structure over the at least one opening. The end of the heat transfer zone facing away from the at least one first opening in the container closes the tubular region and is either flat, conical or dome-shaped in design.

The tubular region of the heat transfer zone is preferably permeable. In this case the end closing the tubular region can likewise be implemented as permeable or else impermeable to water vapor or the gas containing water vapor.

A flat end is formed in particular by an insulation panel which is impermeable to the water vapor or the gas containing water vapor. Such an insulation panel is preferably made from a material having low thermal conductivity and a maximum thermal conductivity of 20 $W(K)^{-1}$, in particular in the temperature range up to 300° C., such as corundum for example.

The permeable region of the heat transfer zone comprises in particular at least one bulk material layer and/or at least one fiber layer and/or at least one textile layer and/or at least one grid layer and/or at least one lattice layer and/or at least one perforated plate.

Ceramic or polymeric material in particular, such as MN for example, graphite-filled plastics and the like, has proven to be suitable for forming a bulk material layer. Suitable fibers for forming a fiber layer are formed for example from metal, in particular steel. Grid and lattice layers are preferably formed from metal wire, in particular from steel. A combination of bulk material and grid or lattice layers, of bulk material and perforated plate, of bulk material, fibers and grid and lattice layers, or of bulk material, fibers and perforated plate is particularly preferred.

The permeable region of the heat transfer zone particularly preferably at least partially comprises materials which have a thermal conductivity of more than 20 $W(mK)^{-1}$, in particular more than 20 $W(mK)^{-1}$, in the temperature range up to 300° C.

It has proven expedient to equip the permeable region of the heat transfer zone on its surface facing the first zone at least partially with a permeable first separating layer and/or on its surface facing the second zone at least partially with a permeable second separating layer.

A heat transfer zone is preferably formed by forming concentric tubes comprising grid, lattice or perforated plate, each of which provides a separating layer. Between the tubes there is formed an annular gap in which a bulk material layer and/or fiber layer is formed in that said gap is filled with bulk material and/or fibers. The meshes of the grid or lattices or the holes of the perforated plate should be dimensioned in this case such that it is impossible for the introduced bulk material or fibers to pass through them.

A textile layer is in this context understood to mean a single-layer or multi-layer warp-knitted fabric, weft-knitted fabric, woven or non-woven. This can be formed from ceramic fibers or threads and/or glass fibers and/or metal fibers and/or plastic fibers.

It is also advantageous to arrange a plurality of differently embodied permeable regions starting from the first opening along the first zone and/or a plurality of differently embodied permeable layers starting from the first zone in the direction of the second zone sequentially in the heat transfer zone. The different permeable regions and/or layers differ in particular in teams of their porosity and/or thermal conductivity and/or bulk density and/or particle size distribution or fiber length distribution and the like.

In the case of the method it has proven advantageous to close the at least one third opening during the blowing cycle before the second process gas is introduced and to open the at least one third opening again after the blowing cycle has been completed. Closing the at least one third opening reliably prevents the second process gas from escaping at least partially unused through the at least one third opening.

As an alternative to closing the at least one third opening, the second process gas may also be prevented from escaping through the at least one third opening if a counter pressure is built up in the region of the at least one third opening. This can be accomplished for example in that the second process gas is introduced into the container not just via the at least one second opening but also via the at least one third opening.

The optimal clocking of condensation and blowing cycles is dependent in this case on the geometric embodiment of the device, the choice of material for constructing the device and also the specific process parameters, such as the quantity and temperature of the first process gas, the quantity of condensing water, the temperature of the second process gas, etc., and can be easily determined for each device by way of experiments.

BRIEF DESCRIPTION OF THE DRAWINGS

FIGS. 1 to 4 are intended to illustrate possible devices and possible methods by way of example. In the figures:

FIG. 1 shows a longitudinal section through a first device in the condensation cycle, FIG. 2 shows a longitudinal section through the first device according to FIG. 1 in the blowing cycle, FIG. 3 shows a longitudinal section through a second device in the condensation cycle, and FIG. 4 shows a longitudinal section through the second device according to FIG. 3 in the blowing cycle.

DETAILED DESCRIPTION OF INVENTION

FIG. 1 shows a longitudinal section through a first device 1 for condensing water from water vapor or from a gas containing water vapor in the condensation cycle. The first device 1 comprises a container 2 made of stainless steel and having a circular circumference, a bottom side 2a in the form of a flat base plate and a top side 2b in the form of a conical closure. A first opening 3 is centrally located in the bottom side 2a of the container 2 and a plurality of third openings 5a, 5b are grouped around said opening on a radius, only two third openings being visible in this view. A first connecting line 6 connects to the first opening 3. Third connecting lines 8a, 8b connect to the third openings 5a, 5b. A second opening 4, to which a second connecting line 7 connects, is formed centrally in the top side 2b of the container 2. The container 2 has a longitudinal axis, said longitudinal axis extending through the center points of the first opening 3 and the second opening 4.

Arranged inside the container 2 is a heat transfer zone 9 which divides the interior of the container 2 into a first zone 10 and a second zone 11. The first opening 3 therefore leads into the first zone 10, while the second opening 4 and the third openings 5a, 5b lead into the second zone 11. Starting from the bottom side 2a of the container 2, the heat transfer zone 9 extends tubularly in the interior of the container 2 in the direction of the second opening 4 and ends at its end facing away from the bottom side 2a of the container 2 in an insulation panel 9d. The insulation panel 9d is formed from corundum. A first separating layer 9a and a second separating layer 9b are arranged in the tubular region of the heat transfer zone 9, each in the form of a tube made of stainless steel mesh, and a bulk material layer 9c arranged and fixed in the annular gap between them. The bulk material layer 9c is formed from AlN.

A condensation cycle is executed first of all in the method for condensing water from water vapor or from gas containing water vapor using the device 1. In this case a first process gas $P_1$ in the form of water vapor or gas containing water vapor is introduced via the first connecting line 6 through the first opening 3 into the first zone 10 of the container 2. The first process gas $P_1$ is then transferred through the tubular permeable region of the heat transfer zone 9 into the second zone 11 (indicated by arrows). The first process gas $P_1$ is cooled in the process and water W condensed. At the same time the heat transfer zone 9 is heated. The condensed water W flows in accordance with gravity in the direction of the bottom side 2a of the container 2 and is discharged through the third openings 5a, 5b of container 2 into the third connecting lines 8a, 8b. A guide system (not shown) in the form of, for example, ridges, grooves or the like can also be arranged here, said elements reliably channeling the condensed water W into the third openings 5a, 5b. The condensed water W can now be supplied, or re-supplied, as feed water for example, to an industrial process for further use, either directly or after it has been subjected to a quality inspection or treatment process.

The cooler—in comparison with the first process gas $P_1$-gaseous residue $R_{P1}$ of the first process gas $P_1$ is discharged through the second opening 4 of the container 2, for example to the environment.

FIG. 2 shows the same longitudinal section through the first device according to FIG. 1, this time in the blowing cycle. Identical reference signs denote identical elements. During the blowing cycle a second process gas $P_2$ in the form of cooling air is introduced via the second connecting line 7 and the second opening 4 into the second zone 11 of the container 2. To prevent the second process gas $P_2$ escaping though the third openings 5a, 5b during the introduction of the second process gas $P_2$ into the second zone 11 of the container 2, the third openings 5a, 5b are closed by a valve (not shown separately) in each case. The second process gas $P_2$ is transferred through the tubular permeable region of the heat transfer zone 9, which has been heated previously by means of the first process gas $P_1$, into the first zone 10 of the container 2 (indicated by arrows). The heat transfer zone 9 is cooled and the second process gas $P_2$ heated in the process.

Finally the heated second process gas $P_2'$ is discharged through the first opening 3 of the container 2 and the first connecting line 6. The heated second process gas $P_2'$ can now be supplied to an industrial process for further use.

The condensation cycle (see FIG. 1) and the blowing cycle (see FIG. 2) are now repeated alternately on the device 1. Before a further condensation cycle begins the third openings 5a, 5b are opened again to allow condensed water W to flow away through them.

FIG. 3 shows a longitudinal section through a second device 100 for condensing water from water vapor or from a gas containing water vapor in the condensation cycle, which device has a similar construction to the first device 1 according to FIG. 1. Identical reference signs denote identical elements.

A heat transfer zone 9' is arranged inside the container 2 and subdivides the interior of the container 2 into a first zone 10 and a second zone 11. The first opening 3 therefore leads into the first zone 10, while the second opening 4 and the third openings 5a, 5b lead into the second zone 11. Starting from the bottom side 2a of the container 2, the heat transfer zone 9' extends tubularly inside the container 2 in the direction of the second opening 4 and ends at its end facing away from the bottom side 2a of the container 2 in the form of a dome 9e. The heat transfer zone 9' is permeable as a whole and is fitted with a first separating layer 9a and a second separating layer 9b, each in the form of a dome made of stainless steel mesh. A bulk material layer 9c made of graphite-filled plastic is arranged and fixed therebetween.

A condensation cycle, as already described with reference to FIG. 1, is executed first of all in the method for condensing water from water vapor or from gas containing water vapor by means of the device 100.

FIG. 4 shows the same longitudinal section through the second device 100 according to FIG. 3, this time in the blowing cycle.

Identical reference signs denote identical elements in the figures. During the blowing cycle a second process gas $P_2$ in the form of cooling air is introduced via the second connecting line 7 and the second opening 4 into the second zone 11 of the container 2. The second process gas $P_2$ is also introduced in the form of cooling air via the third connecting lines 8a, 8b and the third openings 5a, 5b into the second zone 11 of the container 2 in order to generate a counter pressure and prevent the second process gas $P_2$ escaping through the third openings 5a, 5b. The second process gas $P_2$ is transferred through the heat transfer zone 9', which was heated previously by means of the first process gas $P_1$, into the first zone 10 of the container 2 (indicated by arrows). The heat transfer zone 9' is cooled and the second process gas $P_2$ heated in the process.

Finally the heated second process gas $P_2'$ is discharged through the first opening 3 of the container 2 and the first connecting line 6. The heated second process gas $P_2'$ can now be supplied to an industrial process for further use.

The condensation cycle (see FIG. 3) and the blowing cycle (see FIG. 4) are now repeated alternately on the device 100. Before a further condensation cycle begins the third openings 5a, 5b are opened again to allow condensing water W to flow away through them.

With regard to the embodiment of the container shown in the figures chosen by way of example, the arrangement of the first, second and third openings on the container and the shape and embodiment of the heat transfer zone, there are a multiplicity of further design possibilities which can be chosen as alternatives by a person skilled in the art without inventive activity. For example, a container can be operated not only in the vertical position, as shown in FIGS. 1 to 4, but also in the horizontal position, the at least one third opening in this case being arranged at the lowest point of the circular circumference and the heat transfer zone being redesigned accordingly.

The invention claimed is:

1. A device for condensing water from a first process gas in the form of water vapor or a gas containing water vapor, comprising:
    a container having a first opening, a second opening and a third opening; and
    a heat transfer zone arranged in an interior of the container, wherein the heat transfer zone comprises a bulk material layer and/or a fiber layer and/or a textile layer and/or a grid layer and/or a lattice layer and/or a perforated plate,
    wherein the interior of the container is subdivided by the heat transfer zone into a first zone and a second zone, wherein the first opening leads into the first zone and the second and third openings lead into the second zone,
    wherein the heat transfer zone has at least in sections an open porosity and/or channels through which the first process gas can flow from the first zone to the second zone and through which a second process gas in the form of cooling gas can flow in a reverse direction, and
    wherein a permeable region of the heat transfer zone partially comprises materials which have a thermal conductivity of more than 20 W(mK)$^{-1}$ in a temperature range up to 300° C.

2. The device as claimed in claim 1, wherein
    the container has a longitudinal axis, and
    the longitudinal axis extends through a center point or center of mass of the first opening and the second opening.

3. The device as claimed in claim 1, wherein
    the first opening and the third opening are arranged in a region of a bottom side of the container, and
    the second opening is arranged in a region of a top side of the container.

4. The device as claimed in claim 3, wherein, starting from the bottom side of the container, the heat transfer zone extends tubularly to the second opening.

5. The device as claimed in claim 1, wherein
    the heat transfer zone comprises a bulk material layer and/or a fiber layer, and
    the permeable regions of the heat transfer zone are constructed on their surface facing the first zone and/or on their surface facing the second zone with a separating layer in the faun of a grid layer made of metal wire, a lattice layer made of metal wire or a perforated plate.

6. The device as claimed in claim 1, wherein the heat transfer zone further comprises an insulation panel which is impermeable to water vapor or to gas containing water vapor.

7. A method for condensing water from water vapor or a gas containing water vapor, comprising the following alternately executed cycles:
    providing a device comprising
        a container with a first opening, a second opening and a third opening, and
        a heat transfer zone arranged in an interior of the container, wherein the interior of the container is subdivided by the heat transfer zone into a first zone and a second zone;
    performing a condensation cycle by
        introducing a first process gas, which is water vapor or a gas containing water vapor, via the first opening into the first zone,
        transferring the first process gas through the heat transfer zone into the second zone with a condensation of water and a heating of the heat transfer zone, and
        discharging condensed water through the third opening of the container and gaseous residue of the process gas through the second opening; and
    performing a blowing cycle by
        introducing a second process gas in the form of cooling gas via the second opening into the second zone,
        transferring the second process gas through the heat transfer zone into the first zone with cooling of the heat transfer zone, and
        discharging the heated second process gas through the first opening.

8. The method as claimed in claim 7, wherein, during the blowing cycle, the third opening is closed before the second process gas is introduced, and, after the blowing cycle has been completed, the third opening is opened again.

9. The method as claimed in claim 7, wherein, during the blowing cycle, the second process gas is introduced via the third opening into the second zone.

10. The method as claimed in claim 7, wherein the heat transfer zone comprises a bulk material layer and/or a fiber layer and/or a textile layer and/or a grid layer and/or a lattice layer and/or a perforated plate.

11. The method as claimed in claim 7, wherein the heat transfer zone has at least in sections an open porosity and/or channels through which the first process gas can flow from the first zone to the second zone and through which a second process gas in the form of cooling gas can flow in a reverse direction.

12. The method as claimed in claim 7, wherein a permeable region of the heat transfer zone partially comprises materials which have a thermal conductivity of more than 20 W(mK)$^{-1}$ in a temperature range up to 300° C.

* * * * *